Nov. 22, 1960 W. WADE 2,961,276
LUBRICATING SYSTEM
Filed April 10, 1957 2 Sheets-Sheet 1

Nov. 22, 1960 W. WADE 2,961,276
LUBRICATING SYSTEM
Filed April 10, 1957 2 Sheets-Sheet 2
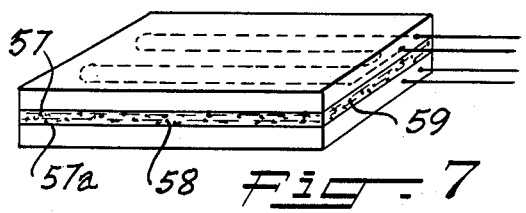
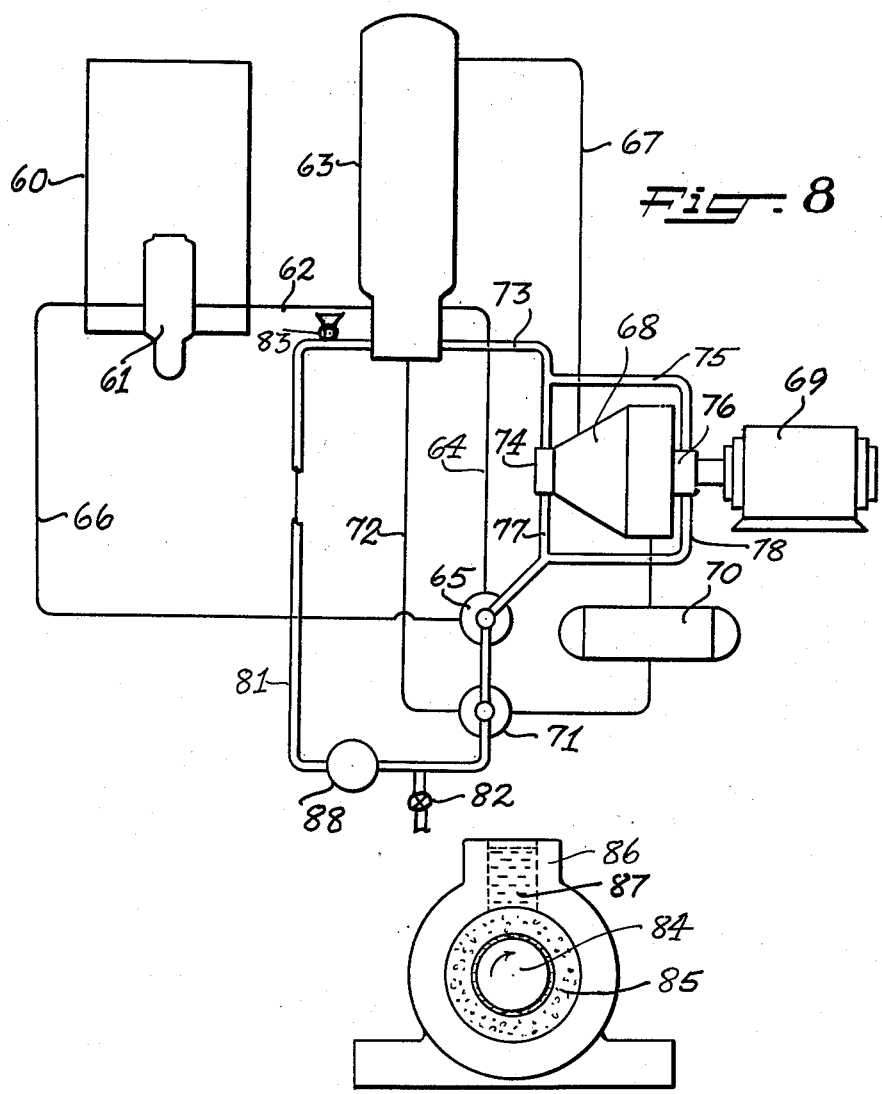

United States Patent Office 2,961,276
Patented Nov. 22, 1960

2,961,276
LUBRICATING SYSTEM

Worth Wade, Rosemont, Pa.
(Alden Park Manor, Philadelphia 44, Pa.)

Filed Apr. 10, 1957, Ser. No. 652,025

5 Claims. (Cl. 308—78)

This invention relates in general to lubricating systems and in particular to lubricating systems for apparatus required to operate at high temperatures and/or under the influence of nuclear radiation. In the following specification and claims the term, "lubricant," and lubricating system is intended to include actuating fluids and actuating systems such as hydraulic systems.

It is well known that organic lubricants such as petroleum oils, silicone fluids and the like can operate only at moderate temperatures such as up to 350° above which they tend to decompose. Further it has been found that such organic lubricants can not withstand prolonged exposure to nuclear radiation, even such mild forms as gamma radiation, without undergoing degradation and loss of efficiency. Therefore, there is a real need for a lubricant which will operate at temperatures above those which can be withstood by organic lubricants and also for lubricants that function continuously in the presence of nuclear radiation.

There is a use for high temperature lubricating systems as in missiles, rockets and high speed aircraft including drones as well as in high temperature apparatus in general where moving parts must function at temperatures much higher than those normally encountered in industrial equipment. The high temperatures created in such equipment may result from the heat of the combustion of the fuel or from skin friction created by the high speed movement of the device through the ambient atmosphere. There are many devices adjacent a nuclear reactor which contain relatively moving parts such as pumps, blowers, motors, turbines control, testing and indicating devices and the like which must operate in the presence of nuclear radiation so strong or temperatures so high that organic lubricants fail.

Therefore, it is a general object of this invention to provide a lubricating system which will operate efficiently and continuously either at temperatures higher than that which can be tolerated by organic lubricants and in the presence of nuclear radiation.

A specific object of the invention is to provide a lubricating system for moving parts which will operate at temperatures above 350° C.

A further specific object of the invention is to provide a lubricating system for moving metal parts which will operate continuously in the presence of nuclear radiation.

Other objects of the invention will in part be obvious and will in part appear hereinafter.

According to the invention there is provided a lubricating system for relatively moving parts comprising means to heat the contiguous surfaces of such parts and a lubricant disposed between the surfaces and comprising a molten metal which has a contact angle with the metal approaching 180° and which is inert with respect to the surfaces. In its simplest embodiment the lubricant consists of a molten inert metal. In a second embodiment, the lubricant comprises a molten metal as a continuous phase containing a dispersed lubricant. In the third embodiment, the metal surface is plated or coated with a metal which is inert with respect to the lubricant metal. In a fourth embodiment the system comprises a porous metal surface containing in the pores a metal of lower melting point which will act as a lubricant when heated.

The surfaces to be lubricated may be metallic or nonmetallic and one surface may be metallic and the other an inorganic surface such for example as glass, ceramic, mica, asbestos, graphite, and the like.

For a more complete understanding of the nature and objects of the invention reference should be had to the accompanying drawings in which:

Figure 7 is a perspective view of another embodiment.

Figure 8 is a diagrammatical representation, partly in section of a nuclear reactor and power system embodying the lubricating system of the invention.

Figure 9 is a perspective view partly in section of a bearing containing lubricant in accord with the present invention.

Figure 1:
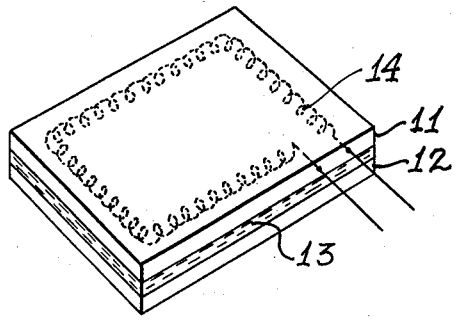
Figure 1 is a perspective view, partly in section, of a simple embodiment of the invention showing one form of a static lubricating system.

The lubricating system of the invention is adapted for lubricating such nuclear devices as, for example (a) Nuclear reactors of all types, including power, research and propulsion types, such for example as, sodium cooled, breeder, homogeneous, organic moderated, liquid metal, gas cooled, pressurized water and boiling water reactors.

(b) The moving parts of devices adjacent nuclear reactors or equipment which is accessory to nuclear reactors, e.g. motors, pumps, turbines control, testing and indicating devices, blowers, cooling systems and any moving structural or operating part.

(c) Vehicles such as aircraft, aeronautical drones, marine vessels, submarines utilizing nuclear power reactors.

(d) Rockets, missiles, either free flight or guided and devices employing rockets.

(e) Projectiles in general, in particular, projectiles operating at high speeds or containing nuclear devices.

The lubricating system of the invention is also applicable to high temperature apparatus not powered by nuclear devices, such for example as, (f) Rockets, missiles, either free flight or guided, jet-assist-take-off devices for aircraft rockets and missiles.

(g) Launching and catapulting devices (h) Vehicles such as aircraft, aeronautical drones, marine vessels, submarines utilizing nuclear power reactors.

(i) Furnaces, kilns and driers.

(j) Solar devices (k) Heat exchangers, in particular for nuclear reactors (l) Curing and vulcanizing apparatus and other apparatus operating at elevated temperatures above the decomposition temperatures of organic lubricants.

Any metal may be used as the lubricant in the present system when it is inert with respect to the relative moving surfaces and has a contact angle, with the metal surface, of approximately 180° and therefore, does not wet the surface of the metal. The metal selected should be one which does not diffuse into the metal surface it contacts but on the contrary, it should be one which does not wet the surface of the metal surface with which it makes contact.

It is apparent that the lubricating metal must be selected with regard to the characteristics of the metal surface to be lubricated. By way of further illustrating but not by way of limiting the invention there is given in the following table a number of examples of metal lubricant-surface combinations:

*Table I*

[EXAMPLES OF MOLTEN METALS FOR USE IN LUBRICATING VARIOUS RELATIVELY MOVING SURFACES: (SUITABLE COMBINATION INDICATED BY "x")]

| Surface to be lubricated | Molten metal for use as lubricant | | | | | | |
|---|---|---|---|---|---|---|---|
| | K | Na | Na-K [1] alloy | Li | Pb | Bi | Bi-Pb [2] alloy | Pb-Sn-Bi [3] alloy |
| Pure iron | x | x | x | x | x | x | x | |
| Mild steel up to 600° C | x | x | x | x | x | x | | |
| 2-9% chromium steel alloy | x | x | | | x | | | |
| Ferritic stainless steel | x | x | x | x | x | x | x | |
| Austenitic stainless steel | x | x | x | | x | | | |
| Aluminium | | | | | x | x | | |
| Beryllium up to 600° C | x | x | x | | x | x | x | x |
| Chromium | x | x | x | | x | x | | |
| Copper base alloy with Al or Si | x | x | x | | | | | |
| Alloy of Mo-Nb-Ta with tungsten | x | x | x | | x | x | x | x' |
| Titanium | x | x | x | | x | | x | x |
| Zirconium | x | x | x | | x | | x | x |
| Fused quartz | x | x | x | | x | x | x | x |
| Graphite | x | x | x | | x | x | | |

[1] Alloy containing 22% Na and 78% K.
[2] Alloy containing 55.5% Bi and balance Pb.
[3] Alloy containing 52.5% Bi, 15.5% Sn and balance Pb.

Unless otherwise stated these combinations are non-corrosive up to 300° C.

The invention also includes lubricants comprising a molten metal and a molten inorganic compound which is inert with respect to both the molten metal and the surfaces to be lubricated. The inorganic compound should also have, in molten state, substantially the same specific gravity as the metal in its molten state at the temperature of use. In is preferred form the inorganic compound is a salt, in particular a salt of the molten metal used as a lubricant. Suitable salts have proper specific gravity for such combinations can be found by consulting the standard handbooks on inorganic chemical compounds.

The list of metals that may be used as lubricants can be widened by treating the metal surface which is to be lubricated. For example, on one embodiment, the metal surface is coated with a more resistant metal, such for example, as by plating iron or steel, copper, or aluminium with chromium or nickel or an oxide of such metals. With surfaces coated with chromium or nickel the lubricating metal may include not only lead, sodium, potassium, magnesium, lithium, tin, but also zinc, strontium, indium, bismuth, and the like.

In another embodiment, the metal surface to be lubricated is treated chemically to render it inert and non-wetting by the lubricating metal. There are several methods for treating the surface. The metal surface may be provided with a continuous oxide coating by oxidizing or anodizing the surface prior to use.

In another embodiment the lubricant comprises a two-phase system in which the molten metal is dispersed as droplets in a continuous phase of a gas which is either inert or which will react with the surface of the metal droplets to form an oxide film thereon. In place of air there may be used any gas that will form a protective skin on the surface of the metal droplets. The droplets are thus dispersed as a dis-continuous phase in the continuous phase of air. The dispersion provided a fine lubricant because the droplets, being coated with inert surface films, do not tend to coalesce.

Referring to Figure 1, the simplest embodiment comprises a mechanical structure having two surfaces 10 and 11 one of which moves relative to the other and between which is disposed a layer or body 13 of molten metal acting as a lubricating fluid. To melt the metal initially, the surfaces are heated by suitable means, for example, electrical heating coil 14 disposed on or embedded in one or both of the surfaces. Where the two surfaces are separated by sufficient space the heating elements may be disposed in the body of the lubricant instead of or in addition to elements disposed in or on the surfaces to be lubricated. In the case of jets and rockets, the heat of combustion of the fuel will be sufficient to melt the lubricating metal so that no additional heating element is needed, the fuel being the heating element.

While the structure in Figure 1 may be assumed to have a static layer or body 13 of lubricant it is to be understood that the invention is not limited to any particular type of lubricating system but includes constant level systems, circulatory systems, spray systems, capillary systems and wick systems and other types. By way of illustration, a few of these systems will be illustrated.

Figure 2:
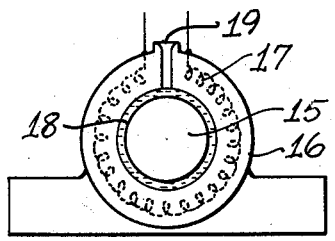
Figure 2 is a perspective view, partly in section, of a second embodiment of the lubricating system for journals.

For example in Figure 2, there is shown a shaft 15 enclosed in a journal 16 having embedded therein means to heat the shaft and journal such as an electric coil 17 so as to maintain a layer of molten metal 18 between the journal and shaft for lubrication. If necessary, additional molten metal may be introduced through the hole 19 in the journal.

Figure 3:
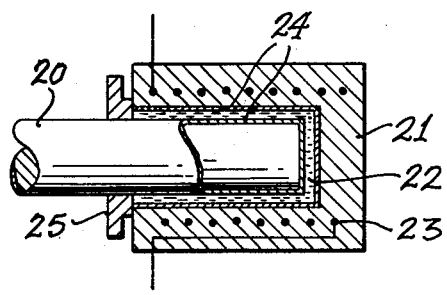
Figure 3 is a view partly in section of a second journal or horizontal shaft bearing.

Another horizontal installation is shown in Figure 3 in which the shaft 20 is housed in a journal 21 lubricated by means of a layer of molten metal 22 which may be maintained in a molten state by the heating coil 23 and sealed by means of the flange 25.

In this embodiment all metal surfaces which are in contact with the molten metal lubricant are plated with a chromium coating 24 by means of which the one may use as a lubricant metals which normally react with or diffuse into steel, iron, copper, aluminium and the like.

Figure 4:
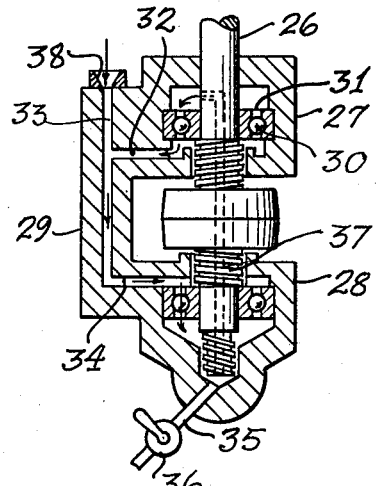
Figure 4 is a diagrammatical representation of a lubricating system for use with a vertical shaft.

In Figure 4, the invention is applied to a vertical shaft 26 which rotates in the journal boxes 27 and 28 of a C-shaped mounting 29. The journals are provided with ball bearings 30 mounted in conventional races 31. The shaft is provided with spiral grooves 37 so that molten metal fed to the lower journal 28 is gradually lifted by means of the groove to the upper journal and drains away through the channel 32 to the feed line 33 and downward to the lower branch line 34. This unit is adapted to be maintained hot enough by external heating means, such as proximity to a nuclear reactor or another means, so that no internal means are required for maintaining the metal lubricant in a molten fluid state. When the device is stopped, the system may be drained of molten metal by means of the pipe 35 having a valve 36. The molten metal may be introduced into the device through the funnel 38.

Figure 5:
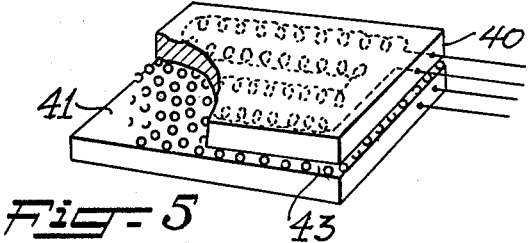
Figure 5 is a perspective view partly in section of another embodiment of the invention.

In Figure 5, there is shown an embodiment in which two surfaces 40 and 41 are lubricated by a two-phase lubricant layer 43 comprising globules of molten metal in a continuous phase of oxygen. The metal is so selected that the surface of the globules are oxidized to form a skin or coating which prevents the droplets from coalescing. Thus the lubricant comprises small balls or droplets which roll between the surfaces as they are moved relative to one another. The air may be heated by external means or the plates' surfaces may be heated by electric coils embedded therein to maintain the metal in molten condition.

Figure 6:
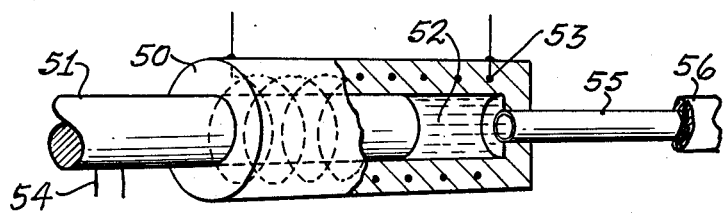
Figure 6 is a view partly in section of an actuating device employing the lubricating system of the invention.

In Figure 6, the present invention is applied to a hydraulic ram comprising a cylinder 50 having a piston 51 adapted to reciprocate therein against a body of molten metal 52 which is maintained in molten condition by means of electrical heating elements 53 and 54 embedded in both the cylinder wall and in the piston. The molten metal may be forced by the piston through the line 55 having insulation 56 to actuate some device not shown.

In Figure 7, there is shown two surfaces 57 and 57a lubricated by means of a layer of liquid comprising a continuous phase 58 of liquid metal and a dispersed phase comprising solid particles 59 such, for example, as metal balls, small ceramic balls, particles of graphite and the like all of which act as lubricants and which are inert to the liquid metal phase.

In Figure 8 there is shown the application of the invention to the lubrication of moving surfaces which are located within the field of the radiation from nuclear reactors. As shown in Figure 8, the system comprises a reactor having a shielding shell 60 of concrete or the like enclosing the nuclear reactor 61 of the boiling water type. The steam from the reactor flows through the primary circuit comprising insulated pipe 62 to the heat exchanger-boiler 63 and from this unit 63 back through the pipe line 64 to the primary pump 65 which returns it to the reactor through the pipe line 66. The secondary circuit comprises the boiler 63 which feeds steam through the pipe line 67 to the steam turbine 68 having a shaft connection to drive the electric generator 69. The steam condensate from the turbine passes to a condenser 70 and then through the secondary pump 71 and pipe line 72 back to the boiler. The molten-metal lubricating system comprises a pipe first passing through the heat exchanger 63 which keeps the metal in the molten state from which it flows by gravity through the insulated pipe line 73 to one end 74 of the turbine shaft and through branch line pipe 75 to the bearings 76 of the generator shaft and from both of these points downwardly through the pipe lines 77 and 78 to a pump 79, then through the pipe line 81 back to the heat exchanger. Thus all the moving parts of the primary pump 65, the secondary pump 71 and the shafts of the turbine and generator are lubricated as previously described by means of the molten metal. When it becomes necessary to stop the reactor or the turbine-generator system, the molten metal may be drained from the lubricating system through the valve 82 and the system refilled with molten metal through the inlet valve 83.

In Figure 9, there is shown an embodiment in which the shaft 84 is supported in a split bearing 85 formed of porous metal. The pores of the porous metal bearing 85 are initially filled with molten lead which is allowed to solidify inside the porous structure. When the shaft starts rotating and heat is generated, either by such rotation or by external means, the lead in the porous bearing gradually melts and forms a lubricating film between the surface of the shaft 84 and the contiguous surfaces of the bearing 85. On top of the bearing there may be positioned a reservoir 86 containing a mass 87 of solid or molten lead which will, in molten state gradually permeate downwardly through the porous structure of the bearing and replace any lead that is used up or escapes during the operation of the shaft.

It is to be understood that the means to initially heat the lubricating metal to the molten state may be means incorporated as a part of the structure to be lubricated as shown in Figures 1, 2 and 3; but the invention also contemplates that the heat for initially melting the metal may be derived from (a) an external source such as the heat exchanger 63 shown in Figure 8 or (b) from the ambient temperature of the atmosphere or surfaces surrounding the moving parts as in solar furnaces, jet motors, rockets.

In the appended claims, the term "metal" is intended to include metals in pure state and metal alloys, and the term "lubricant" is intended to include hydraulic and actuating fluids.

I claim:

1. In a lubricating system, the combination of, at least two contiguous relatively movable surfaces of which at least one is metallic, a lubricating film disposed between said surfaces, said film comprising a normally solid metal in the molten state which does not wet the metallic surface being lubricated and separate heating means positioned to maintain said lubricating metal in the molten state.

2. A lubricating system as recited in claim 1 in which the heating means is located within the metal surface being lubricated.

3. A lubricating system as recited in claim 1 in which the heating means is located in the molten metal serving as a lubricant.

4. A lubricating system as recited in claim 1 in which the lubricating film comprises a particulate lubricant material dispersed in the film of molten metal.

5. A lubricating system as recited in claim 1 in which means are provided for continuously passing said lubricating film between said relatively moving surfaces.

References Cited in the file of this patent

UNITED STATES PATENTS

| | | |
|---|---|---|
| 401,721 | Sedgwick | Apr. 16, 1889 |
| 1,754,085 | Faus | Apr. 8, 1930 |
| 1,941,768 | Vigne | Jan. 2, 1934 |
| 2,063,721 | Bradley | Dec. 8, 1936 |
| 2,335,224 | Atlee | Nov. 30, 1943 |
| 2,449,771 | Dolan | Sept. 21, 1948 |

FOREIGN PATENTS

| | | |
|---|---|---|
| 706,795 | Great Britain | Apr. 7, 1954 |